United States Patent
Nakahata et al.

[15] 3,698,353
[45] Oct. 17, 1972

[54] INDICATOR PROVIDED WITH A PLURALITY OF CONCENTRIC INDICATING NEEDLES

[72] Inventors: Masatake Nakahata; Tatsuo Sugi, both of Mitaka, Japan

[73] Assignee: Tokyo Seimitsu Co., Ltd., Tokyo, Japan

[22] Filed: Feb. 24, 1971

[21] Appl. No.: 118,253

[30] Foreign Application Priority Data

Feb. 27, 1970 Japan ..................... 45/18699

[52] U.S. Cl. ........... 116/129 A, 116/129 T, 324/114, 324/154
[51] Int. Cl. .............................................. G09f 9/00
[58] Field of Search ... 116/129, 129 A, 129 B, 129 T; 324/114, 115, 154

[56] References Cited

UNITED STATES PATENTS

| | | |
|---|---|---|
| 840,569 | 1/1907 | Lea .......................... 324/114 |
| 2,123,376 | 7/1938 | Moeger ............ 116/129 T UX |
| 2,514,745 | 7/1950 | Dalzell ................ 116/129 A X |
| 2,539,143 | 1/1951 | Knudsen ..................... 324/114 |
| 2,613,629 | 10/1952 | Maybarduk ............... 116/129 |
| 3,175,531 | 3/1965 | Du Bois .................. 116/129 A |
| 3,361,968 | 1/1968 | Solow ........................ 324/114 |

Primary Examiner—Louis J. Capozi
Attorney—Robert E. Burns and Emmanuel J. Lobato

[57] ABSTRACT

An indicator is provided with a plurality of indicating needles on the same indicating surface. The revolving axis of the indicating needles are arranged on one straight line. One of the indicating needles is provided for indicating a low sensitivity range (L range), another of the indicating needles is provided for indicating a high sensitivity range (H range). By using the above-mentioned indicator in automatic measuring apparatus, the indication of full range grinding and the condition of precise grinding are read at the same time and on the same indicating surface.

6 Claims, 3 Drawing Figures

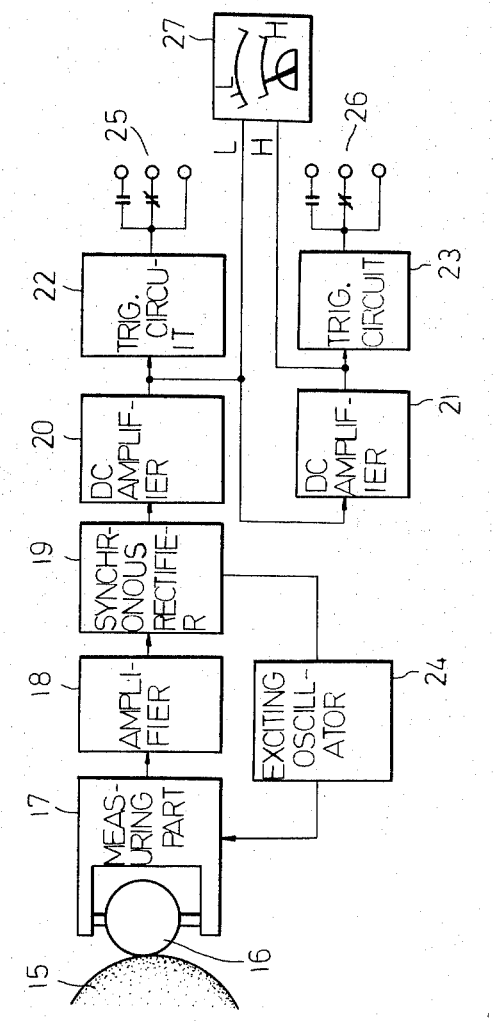
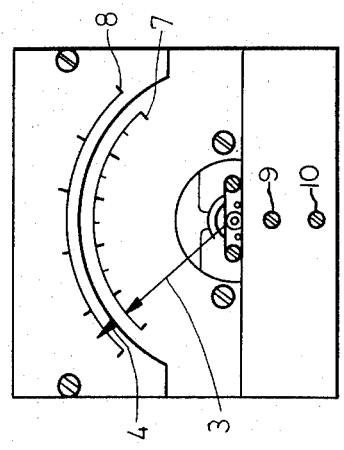
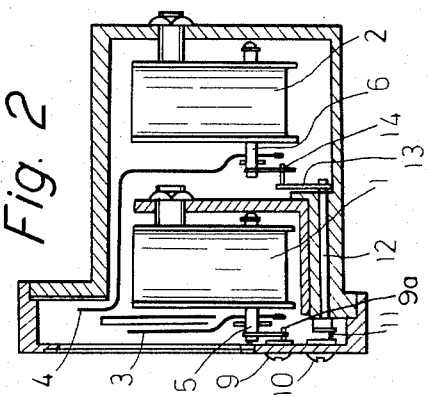

INDICATOR PROVIDED WITH A PLURALITY OF CONCENTRIC INDICATING NEEDLES

The present invention relates to an indicator, mainly utilized in an automatic measuring device.

An automatic measuring device is one of the measuring control apparatuses which directly measures a dimension of work being ground, applies a signal corresponding to a variation of the dimension of the work to the grinding device thereby controlling the grinding speed and the amount of the grinding, and stops the grinding motion when the dimension of the work reaches a predetermined value.

Generally used automatic measuring devices relate to the utilization of the analogue measuring technique. However, an accuracy limit in the analogue measurement does not generally exceed about ± 1 – 0.5 percent of the full scale of the indicator used in the measuring device. Accordingly, it is necessary that two amplifiers for low sensibility range and for high sensibility range are provided in the automatic measuring device and these amplifiers are used in the following manner. That is, the amplifier for the low sensibility range is used in normal grinding for detecting a grinding limit for which the grinding speed and the amount of grinding are measured and the whole range of procedure of the grinding to a predetermined size can be observed. During the above-mentioned normal grinding, the grinding speed is changed to the speed for precise grinding. And when the amplifier for high sensibility range is used in a finishing grinding, a high accuracy for grinding can be obtained even in the narrow full scale condition, and the signals for stopping the grinding when a predetermined is reached can be precisely generated.

The above-mentioned two kinds of ranges are commutated manually or automatically. However, when only one indicator is used in two kinds of measuring ranges, the indication of the indicator is only carried out in either one of the measuring ranges, and it is necessary that another indication is used which relates to indicating whether H range or L range is actually utilized. Further, it is necessary to check the accuracy as to whether the indications in H range and L range are included in the mutual error of the indicator or not. In this case, sometimes, two indicators are provided in parallel and one is used in the H range and the other is used in the L range. However, the above-mentioned method is troublesome, for example, when the indications of two indicators are compared, because it is difficult to watch the two indicators at the same time.

The object of the present invention is to overcome the above-mentioned drawback.

Another object of the present invention is to provide an indicator which has two indicating needles on one indicating surface allowing two indications to be read at a glance.

A further object of the present invention is to provide an indicator which carries out the two measurements at the same time and compares those measured values.

Further features and advantage of the present invention will be apparent from the ensuing description with reference to the accompanying drawings to which, however, the scope of the invention is in no way limited.

FIG. 1 shows a front view of one embodiment of an indicator of the present invention, FIG. 2 shows a sectional view of one embodiment of an indicator of the present invention, FIG. 3 shows one example of the application of the indicator of the present invention.

Referring to FIGS. 1 and 2, the first indicator 1 and the second indicator 2 are arranged so as to revolve around an axis 5 of an indicating needle 3 and a revolving axis 6 of an indicating needle 4 arranged on one straight line. The extremities of the indicating needles 3 and 4 are arranged on a front panel of the indicator, and the indicating values are read by using two arc type scales 7 and 8 having a concentric center. The zero adjustors 9 and 10 of each indicator 1 and 2 are arranged on a front cover of a front pannel of the indicator. Each of the zero adjustors comprises an adjusting element rotatably mounted on the front cover and provided with a slot to receive a screw driver or other tool for rotating the element. The mechanism of the zero adjustment by the zero adjustors 9 and 10 are composed of an eccentric pin mechanism. The mechanism for the zero adjustor 9 comprises an eccentric pin 9a provided on the rear of the rotatable adjusting element and coupled with the hair spring of the indicating needle 3. The shaft 12 coupled to the eccentric pin 11 transmits the revolution of the zero adjustor 10 to an eccentric plate 13 provided on a rear end portion of the shaft 12, and a pin 14 fixed on the eccentric plate 13 coupled with the hair spring of indicating needle 4.

One example of the automatic measuring apparatus using an indicator having the above-mentioned construction is shown in FIG. 3. Referring to FIG. 3, a grinder 15 of a grinding machine contacts a work 16 grinding same. A variation of the dimension of the work 16 ground by the grinder 15 is converted to an output electric signal of a measuring part 17. The output signal of the measuring part 17 is supplied via an amplifier 18 to a synchronous rectifier 19. An exciting oscillator 24 connected to the synchronous rectifier 19 is provided for exciting the detector in the measuring part 17. The output of the synchronous rectifier 19 is amplified by the DC amplifier 20 and supplied via a trigger circuit 22 to an output terminal 25. Further, the other output of the DC amplifier 20 is further amplified by a DC amplifier 21 and supplied via a trigger circuit 23 to an output terminal 26. Two outputs of the DC amplifiers 20 and 21 are supplied to an indicator 27 via input terminals L and H, respectively. The output of the trigger circuit 22 is provided as a wide range control signal for the normal grinding, and the output of the trigger circuit 23 is used for precise grinding.

In the above-mentioned circuit, the output of the DC amplifier 20 is supplied to the indicator 27 as an L range signal, and the output of the DC amplifier 21 is supplied to the indicator 27 as an H range signal. According to the present invention, two indicators indicating the H range and L range, respectively, are arranged as indicator 27 provided with two concentric indicating needles. Then, all ranges of the displacement of the work in grinding is observed in the L range scale, and the range of the displacement of the work in precise grinding is indicated in the H range scale in the same panel.

As mentioned above, as the indication of all range grinding and the condition of precise grinding are read in the same panel of the meter, the drawback of the conventional apparatus can be completely overcome.

Further, the above-mentioned explanation is easily applicable for the indicator which carries two measurements at the same time and compares those measured values.

What is claimed is:

1. In an indicator for measuring apparatus comprising a plurality of movements arranged coaxially one behind another, a front panel disposed in front of the forwardmost movement and having concentrically arranged arcuate scales thereon, one for each movement, said movements having indicating needles rotatable about the common axis of said movements and cooperating respectively with said scales to provide readings, the improvement comprising each of said movements having a hair spring, a first rotatable zero adjustor on said front panel comprising an eccentric pin on the rear of said panel coupled with the hair spring of the forwardmost movement to adjust said movement, a second rotatable zero adjustor on said front panel, a shaft extending rearwardly from said second zero adjustor parallel to said common axis, and an eccentric pin carried by a rear end portion of said shaft and coupled with said hair spring of a second said movement to adjust said movement, whereby said movements are individually adjustable from said zero adjustors on said front panel.

2. An indicator according to claim 1 in which said zero adjustors are alike, said second zero adjustor having an eccentric pin on the rear of said panel coupled with a coupling portion on the front end of said shaft.

3. An indicator according to claim 2 in which a plate is fixed on the rear end of said shaft and said eccentric pin coupled with said hair spring of said second movement is fixed on said plate.

4. An indicator according to claim 1 in which one said movement measures a value in a high measuring range and another said movement simultaneously measures the same value in a low measuring range.

5. Measuring apparatus comprising a plurality of movements arranged coaxially one behind another, a front panel disposed in front of the forwardmost movement and having concentrically arranged arcuate scales thereon, one for each movement, said movements having indicating needles rotatable about the common axis of said movements and cooperating respectively with said scales to provide readings, one of said scales being a high measuring range scale and another of said scales being a low measuring range scale, each of said movements having a hair spring, a zero-adjustor for each of said movements on said front panel, each zero adjustor being connected with the hair spring of a respective movement to adjust said movement, means for sensing a value to be measured and generating an electrical signal proportional to said value, first amplifying means for amplifying said signal means for feeding said amplified signal to one said movement the indicating needle of which cooperates with said low range scale, second amplifying means for further amplifying said signal, and means for feeding said further amplified signal to another of said movements the indicating needle of which cooperates with said high range scale, whereby a low measuring range reading and a high measuring range reading of the same value are simultaneously indicated on said scales.

6. Measuring apparatus according to claim 5 in which one said zero adjustor comprises a first rotary adjusting element on the front panel carrying an eccentric pin coupled with the hair spring of the forwardmost movement and another said zero adjustor comprises a second like rotary adjusting element on the front panel, a shaft coupled with said second adjusting element and extending rearwardly parallel to said common axis and an eccentric pin on the rear end of said shaft coupled with the hair spring of a second movement.

* * * * *